United States Patent [19]

Blumenthal et al.

[11] 4,271,417
[45] Jun. 2, 1981

[54] ELECTROGRAPHIC IMAGING WITH NON-SEQUENTIAL ELECTRODE ACTUATION

[75] Inventors: John Blumenthal, Wickliffe; Chad Z. Moore, Brecksville, both of Ohio

[73] Assignee: Gould Inc., Rolling Meadows, Ill.

[21] Appl. No.: 963,405

[22] Filed: Nov. 24, 1978

[51] Int. Cl.³ .......................... G01D 15/06; G11B 9/08
[52] U.S. Cl. .................................................. 346/154
[58] Field of Search ............................. 346/154–155, 346/74.1, 153; 101/DIG. 13

[56] References Cited

U.S. PATENT DOCUMENTS

| | | | |
|---|---|---|---|
| 3,611,419 | 10/1971 | Blumenthal | 346/155 |
| 3,653,065 | 3/1972 | Brown, Jr. | 346/154 |
| 3,662,396 | 5/1972 | Brown, Jr. | 346/154 |
| 3,792,495 | 2/1974 | Bliss | 360/154 |
| 4,030,107 | 6/1977 | Tagawa | 360/154 |
| 4,054,885 | 10/1977 | Rothgordt | 346/154 |

Primary Examiner—John H. Wolff
Attorney, Agent, or Firm—Edward E. Sachs

[57] ABSTRACT

Disclosed is a method and apparatus for charging a charge retentive surface of a record medium with a latent electrostatic image. The apparatus comprises a plurality of arrays of recording electrodes. The arrays are alternately divided into first and second groups of arrays. A plurality of complementary electrodes are mounted adjacent the record medium in electrical cooperative relationship with a single array in each of the first and second groups of arrays. The apparatus further includes a control circuit for the recording and complementary electrodes. The control circuit comprises a first group actuating circuit for actuating like-numbered recording electrodes in each array in the first group of arrays, a second group actuating circuit for actuating like-numbered recording electrodes in each array of the second group of arrays, and complementary electrode actuating circuitry for actuating complementary electrodes in electrically cooperative relationship with a selected array of recording electrodes. The method and apparatus is characterized in that the first and second group actuating circuits and the complementary electrode actuating circuits are enabled in such a sequence that no complementary electrode is twice actuated without the intervening actuation of at least one other complementary electrode.

9 Claims, 7 Drawing Figures

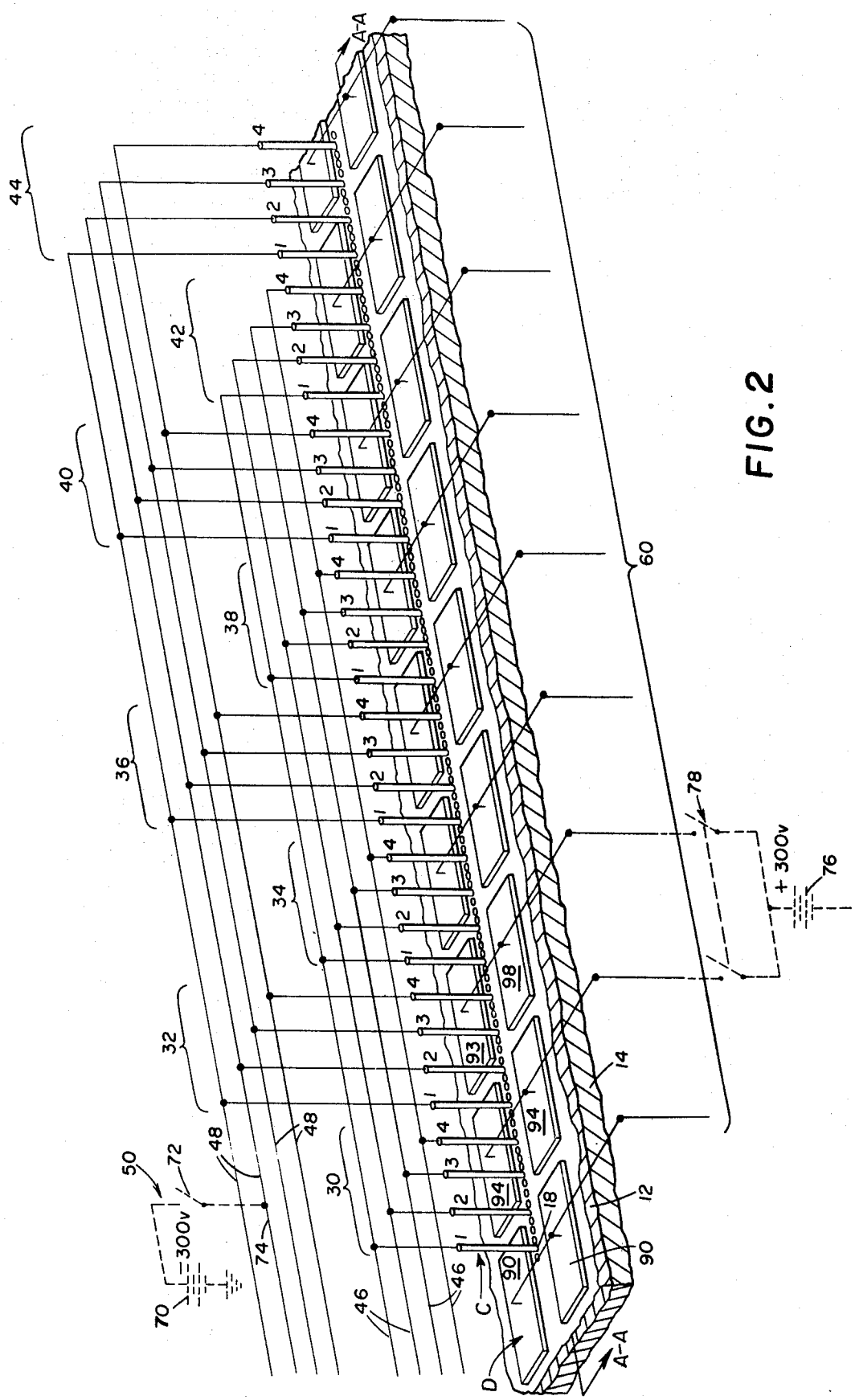

ELECTROGRAPHIC IMAGING WITH NON-SEQUENTIAL ELECTRODE ACTUATION

BACKGROUND OF THE INVENTION

This application pertains to the art of electrographic recording systems and more particularly to an apparatus and method for forming electrostatic latent images on a record medium in accordance with information provided by electronic signals.

This invention is particularly applicable to high speed recorders such as peripheral equipment for computers, telecopy, and the like and will be described with particular reference thereto. It will be appreciated that the invention has broader aspects for recording alphanumeric, pictorial, and graphic data. It is amenable to receiving electronic signals in a raster format as would be used from producing a CRT or video display.

The electrographic recording process is generally characterized by two steps. The first step is the establishment of an electrostatic latent image on a record medium by electrically charging selected areas of the medium with electrostatic recording electrodes connected to charging circuit means. The second step is rendering the electrostatic latent image visible by toning or developing the charged areas on the record medium.

More specifically a special paper is passed over an image head which contains the electrostatic recording electrodes. A suitable paper for use as the record medium is described in U.S. Pat. No. 3,657,005 assigned to the same assignee as the present application. Generally, the image head consists of a generally linear assembly of needle-like recording electrodes or styli. Adjacent the assembly of recording electrodes is one or more assemblies of complementary electrodes or shoes. The latent image is formed on the record medium by applying a negative voltage to the recording electrodes and a positive voltage to the complementary electrodes. A potential difference between the recording and complementary electrodes of approximately 500 volts results in the deposit of a negative electrostatic charge on the record medium under a recording electrode. Suitable image heads are disclosed in U.S. Pat. Nos. 3,611,419 and 3,653,065 assigned to the same assignee as the present application.

Generally, the recording electrodes are charged with a voltage of a first polarity, for example −300 volts, and the complementary electrodes are charged with a voltage of the opposite polarity, for example +300 volts. When these two voltages are applied contemporaneously to a recording electrode and complementary electrode, a localized negative charge is deposited on a dielectric surface of the above special paper. If the two voltages are not applied contemporaneously the potential fails to achieve the amplitude required to deposit a charge on the above paper.

The principal that a recording electrode and adjacent complementary electrode must be actuated contemporaneously to establish a latent image allows for a reduction in the number of circuits necessary for actuating the recording and complementary electrodes. As shown in more detail, in U.S. Pat. No. 3,653,065, supra, the assembly of recording electrodes are divided into a number of arrays and the arrays divided into two groups of alternating arrays. In each group, like-numbered electrodes in each array are connected together. A plurality of complementary electrodes are similarly provided, specific complementary electrode(s) are mounted adjacent each array of recording electrodes. To form a latent image under one or more of the recording electrodes in a selected array, the selected recording electrodes of one group and the adjacent complementary electrodes to the selected array are actuated in coincidence. Actuating the selected recording electrode actuates like-numbered recording electrodes in every array in the group. However, if only the complementary electrodes adjacent to the selected array are actuated simultaneously, then a latent image is formed only under the selected recording electrodes.

To print a line of data, i.e. a set of electronic signals indicating whether an electrostatic charge is to be or not be deposited under each recording electrode, the system divides the line into segments. Each segment corresponds to one of the arrays of recording electrode. The segments corresponding to the arrays are serially connected alternately to the first and second groups of arrays. Contemporaneously with the segment corresponding to the first array being connected thereto, the complementary electrodes adjacent the first array are actuated. The process continues similarly for the second, third, fourth, and subsequent arrays until the entire line of data has been recorded. The record medium advances slightly and the process is repeated for second and subsequent lines of data.

After the record medium has received the latent image, it advances to a development area in which toner is supplied to the surface. The toner includes black particles which adhere only to the charged areas of the surface. The excess toner is removed from the non-charged areas of the record medium and the toner fixed to the charged surface areas. The record medium then emerges from the recorder as a permanent, printed record.

One of the principal problems with this type of recorder is what is known as a striping effect. That is, the intensity of the toned electrostatic image produced by the recorder varies in a repeating pattern across the image head. The toned images vary from grey to black with a periodicity comparable to the array sizes. This resultant striping is undesirable.

SUMMARY OF THE INVENTION

The present invention contemplates a new and improved apparatus and method for controlling the recording and complementary electrodes which overcomes the above referenced problems yet is simple, economical and retains high printing speeds. In accordance with the present invention there is provided an improved electrostatic recording apparatus for recording on an electrostatic charge retentive record medium. The apparatus comprises an image head, and a control circuit. The image head comprises a plurality of recording electrodes and complementary electrodes. The recording electrodes are divided into a plurality of arrays which arrays are divided into at least two alternating groups of arrays. Each of the complementary electrodes is mounted adjacent a single one of the arrays within one of the groups of arrays and spaced from the other arrays in that group. The image head is adapted to be positioned in close proximity to the record medium to form a latent electrostatic image thereon. A first circuit may interconnect like-numbered recording electrodes in each array in the first group and second or subsequent circuits may interconnect like-numbered recording electrodes in each array of the second or subsequent groups. The control circuit includes means for actuating selected recording electrodes, means for enabling the arrays of the first and second groups, and means for actuating at least one of the complementary electrodes. Further, the control means includes sequencing means for controlling the order in which the arrays of recording electrodes are enabled and in which the complementary electrodes are actuated. The sequence is such that the same complementary electrode is not actuated twice in immediate succession. In the preferred embodiment the sequence is such that complementary electrodes adjacent to every third array are actuated in immediately succession.

Further in accordance with the present invention there is provided a memory for storing a line or part of a line of data and a memory address generator. The address generator addresses the memory to select nonadjacent segments of the line of data for actuating recording electrodes in a corresponding array and actuates the complementary electrodes adjacent to the corresponding array.

The principle object of the invention is to reduce image degradation and to produce an image with more uniform quality.

An object of the present invention is to reduce or eliminate the striping effect in the printed record.

Another object of the invention is to image segments of a line of data in non-sequential order.

Other objects and advantages of the invention will appear from the following detailed description to be read in conjunction with the accompanying drawings.

BRIEF DESCRIPTION OF THE DRAWINGS

Invention may take physical form in certain parts and arrangements of parts, a preferred embodiment of which will be described in datail in this specification and illustrated in the accompanying drawings which form a part hereof.

FIG. 2 is a diagrammatic representation of an image head similar to the head in FIG. 1;

DESCRIPTION OF THE PREFERRED EMBODIMENT

Figure 1:
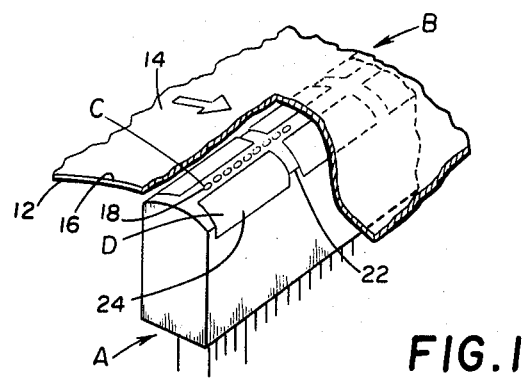
FIG. 1 is a perspective view of a portion of an image head for electrostatic recording adjacent to a record medium.

Referring now to the drawings wherein the showings are for the purposes of illustrating the preferred embodiment of the invention only and not for purposes of limiting the same. FIGS. 1 and 2 show electrostatic charging means comprising an image head A in conjunction with a record medium B on which an image is to be recorded. The recording head comprises a multiplicity of recording electrodes or styli C and plurality of complementary electrodes or shoes D. The image head and in particular the recording electrodes and the complementary electrodes are connected with a control circuit E, note FIG. 6. The control circuit E includes receiving means F for receiving electronic data. The electronic data, for example, may be in the form of raster scan data tapped off from a video display. The control circuit further includes an image memory means G for holding a line of electronic data and a sequencing means H for addressing the memory means G and enabling actuation of selected recording electrodes and complementary electrodes. The sequencing means causes the recording electrodes to be enabled in such an order that recording electrodes do not attempt to induce an electrostatic image in a region of the record medium which has previously been subjected to a potential from a complementing electrode until the potential in such region has returned generally to a reference voltage. In the preferred embodiment, arrays of recording electrodes and the complementary electrodes in electrically cooperative relationship with the arrays are actuated in such a sequence that adjoining arrays are not actuated sequentially. In order words no complementary electrode is twice actuated to apply a potential to the record medium without the intervening actuation of at least one other complementary electrode. This allows time for any potential on the record medium from the first actuation to dissipate.

The image head A is positioned adjacent a record medium feed path, such that the image head is adpated to be in close physical proximity to record medium B. The record medium B comprises a dielectric layer or stratum 12 combined with a conductive layer or stratum 14. In operation, the record medium is oriented so that an exposed charge retentive surface 16 of dielectric layer 12 substantially engages the surface of the charging means or image head A.

The image head A comprises a plurality of closely spaced recording electrodes arranged generally thereacross. The number of recording electrodes is preferably sufficient to span the width of the record medium as it passes the image head. Each recording electrode has a relatively small area 18 exposed and so positioned that it comes into close proximity with the record medium during a recording operation. The recording electrodes C are generally small, closely spaced electrical conductors embedded in a support 22 composed of a suitable dielectric material such as a plastic or a ceramic. The ends 18 of the recording electrodes are substantially flush with the surface of the support. By way of example, the recording electrodes can be approximately 10 mils in diameter and spaced on approximately 12.5 mil centers so that they are separated by about 2.5 mils. The recording electrodes C, as illustrated, are linearly arranged. However, they are adaptable to a variety of arrangements such as a generally liner arrangement in which the electrodes are staggered for closer compaction of the image produced, or they may be arranged in rectangular areas to generate alpha-numeric symbols, or the like. Generally the more closely the recording electrodes are arranged, the finer the resolution of the image becomes.

The complementary electrodes D are mounted in support 22 with surfaces 24 substantially flush with the surface of support 22. The recording electrodes C are mounted in support 22 with faces 18 substantially flush with the surface. Preferably the surface of the image head A is slightly curved so that the recording medium may be arched against it during recording for firmer engagement. The complementary electrode means D are generally rectangularly shaped electrical conductors of much greater size than recording electrodes C. They are arranged in a parallel relationship with the recording electrode C centered between and parallel to pairs of complementary electrodes. The exposed surface of complementary electrodes D may for example be coated with a high permittivity dielectric such as barium titanate for protection against accidental shorting.

Looking to FIG. 2, the recording electrodes are divided into arrays 30, 32, 34, 36, 38, 40, 42 and 44. Each array contains a plurality of recording electrodes illustrated as 1, 2, 3 and 4. Like-numbered electrodes of alternate arrays, 30, 34, 38 and 42 are connected together by a first circuit means 46. Taken together arrays 30, 34, 38 and 42 form a first group of arrays. The arrays alternately arranged between the arrays of the first group, that is, arrays 32, 36, 40 and 44, similarly have like-numbered recording electrodes connected together by a second circuit means 48. Taken together arrays 32, 36, 40 and 44 form a second groups of arrays. The first and second group of arrays are electrically independent. It will further be appreciated that the number of arrays may vary and is in no way limited to the eight arrays shown for illustration. Normally, the number of arrays would exceed the eight illustrated in FIG. 2. Further, the number of recording electrodes in each of the arrays would normally far exceed the four shown for purposes of illustration. Nor is the number of groups of arrays limited to two. Rather three, four, or more groups of arrays may be used.

The complementary electrodes are arranged in electrically cooperative relationship with arrays of recording electrodes. In the preferred embodiment the row of recording electrodes is flanked by a row of complementary electrodes. Each complementary electrode consists of two electrically common elements such that recording electrodes are centered in a central area of the complementary electrode. Each complementary electrode is adjacent to only one array in each of the first and second groups of arrays. The complementary electrodes are separated from every other array of the same group by at least a part of an array of the other group.

Figure 6:
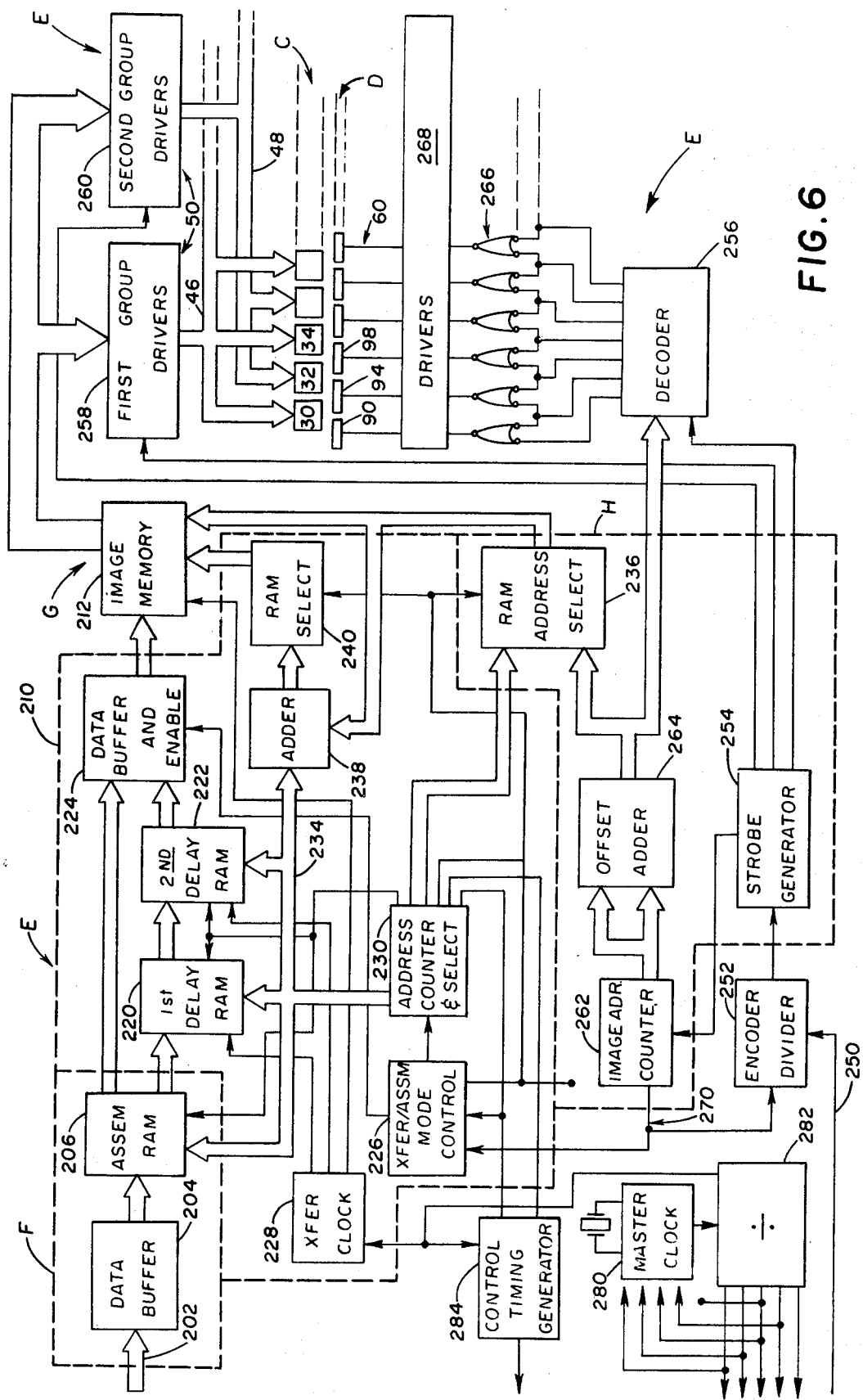
FIG. 6 is a block diagram of a control circuit for controlling the image head electrode potentials in FIG. 1.

The recording electrodes of the first and second groups are connected by circuit means 46 and 48, respectively with the control means E of FIG. 6. The control means includes a record electrode actuating means 50 for applying a voltage of a first polarity to selected recording electrodes alternately in each of the arrays of the first and second groups.

The complementary electrodes are connected by an electrical connection means 60 to the control means which is illustrated in detail in FIG. 6. The control means includes a complementary electrode actuating means for applying voltage of a second polarity to selected sets of complementary electrodes. Suitable voltages for application to the recording electrodes and the complementary electrodes are −300 volts for the recording electrodes and +300 volts for the complementary electrodes. Other voltages may, of of course, be chosen. The potentials required to produce a latent electrostatic image vary with the nature of the record medium and the geometry of the recording and complementary electrodes. However, for the geometry and the record medium of the presently disclosed preferred embodiment, a voltage difference between the recording and complementary electrodes of over 500 volts has been found to be preferred. U.S. Pat. No. 3,611,419, supra, provides a more detailed description of electrical potential considerations, the disclosure of which patent is incorporated herein by reference.

For purposes of simply illustrating the invention, imagine a battery 70 having a −300 volt terminal connected to one side of a switch 72. Further, imagine that switch 72 is connected with one of the lines in either the first or second circuit means, for example a line 74. Further, imagine a second battery 76 having a +300 volt terminal connected with a double pole, single throw switch 78. Switch 78 is connected to the pair of complementary electrodes 94,98 flanking array 32. When it is desired to print a dot in the position corresponding to electrode number 2 in array 32, the control means causes switches 72 and 78 to close essentially simultaneously. Closing switch 72 causes the recording electrodes 2 of arrays 34, 36, 40 and 44 to be charged to −300 volts.

Figure 3A:
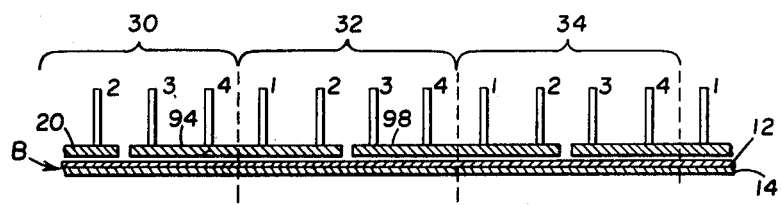
FIG. 3A is a sectional view through line A—A of FIG. 2.
Figure 3B:
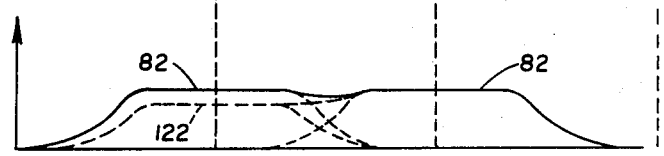
FIG. 3B is a graphic illustration of electrical potentials induced in the conductive stratum of the record medium indicated by the complementary electrodes in FIG. 3A.

Closing switch means 78 causes a momentary positive voltage distribution as illustrated by curve 82 in FIG. 3B to be induced in the conductive layer 14 of the record medium. Thus, the two potentials are coincident only beneath electrode 2 of array 32 causing there a total potential difference of 600 volts between recording electrode 2 of array 32 and the underlying region of the record medium. This potential difference is sufficient to form an electrostatic latent image on the record medium beneath face 18 of electrode 2 of array 32.

This technique of actuating all like-numbered recording electrodes in one of two groups of arrays and coincidently actuating complementary electrodes flanking an array in the one group is also known as A-B phasing. U.S. Pat. No. 3,653,065, supra, provides a more detailed description of A-B phasing, the specification of which patent is incorporated herein by reference. In U.S. Pat. No. 3,653,065 the sequence of actuating recording arrays is alternately actuating like-numbered electrodes in the first and second groups; the sequence of actuating complementary electrodes, is actuating pairs of complementary electrodes of flanking the arrays serially, i.e. flanking array 30, then array 32, then array 34, etc.

In the serial actuation mode, complementary electrodes 90 and 94 are actuated coincidently with selected recording electrodes of the first group. This forms latent images under selected recording electrodes of the first array 30. In the next time period, selected recording electrodes of the second group are actuated coincident with complementary electrodes 94 and 98. This forms latent images under selected recording electrodes of second array 32. This sequence continues similarly along the entire image head. This sequence causes complementary electrode 94 to be twice actuated in a very short time interval. Similarly in each pair of actuated complementary electrodes, the one nearest the precedingly activated array is also twice actuated within a short time interval. This rapid double actuation of complementary electrodes is a cause of striping.

Figure 4:
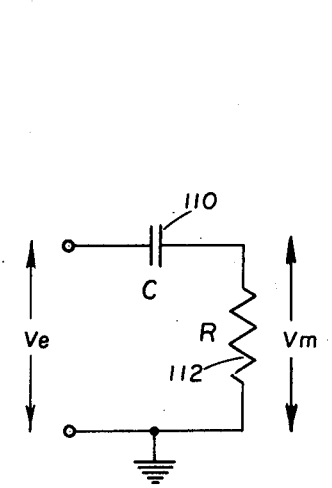
FIG. 4 is an electrical equivalent circuit diagram depicting electrical relationships between electrodes and record medium.
Figure 5:
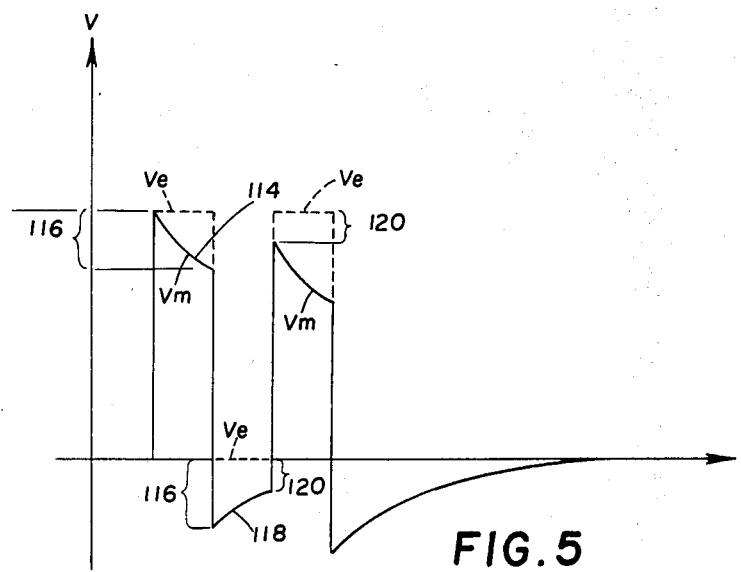
FIG. 5 is a graphic illustration of electrical potentials across elements of FIG. 4.

FIG. 4 shows an equivalent circuit for the complementary electrode and record medium. The voltage, $V_e$, applied to the complementary electrodes is generally a square pulse as illustrated in FIG. 5. This pulse has an amplitude, in the preferred embodiment, of 300 volts and a time duration sufficient to allow coincident actuation of selected recording electrodes and charge transfer to the record medium therefrom. The complementary electrode along with the underlying conductive layer 14 of the record medium forms a capacitor 110. The plates of capacitor 110 are physically separated by the dielectric coating 12 and any air gap between the complementary electrode and the record medium. The conductive layer 14 of the record medium has an electrical resistance represented by a resistor 112. In the equivalent circuit, resistor 112 connects the capacitor 110 to ground. The potential applied to the conductive layer of the record medium is the voltage $V_m$ across resistor 112. When that complementary electrode actuating pulse $V_e$ is first applied the voltage $V_m$ is equal to the voltage $V_e$. Once the complementary electrode voltage pulse reaches its steady state level, capacitor 110 charges exponentially through resistor 112 toward value $V_e$. This causes voltage $V_m$ to decay exponentially as illustrated at 114 in FIG. 5 while the potential across capacitor increases. The rate of the decay is determined by the RC time constant of capacitor 110 and resistor 112.

At the end of an actuation cycle, the complementary electrode voltage is driven back to a reference level. This similarly drives the voltage $V_m$ down by the same amount. However, because the voltage on the conductive layer had decayed along curve 114, it is below $V_e$ by a voltage 116 the voltage drop across the capacitor. Accordingly, as the complementary electrode is driven back to the reference voltage, the voltage on the conductive layer 14 is driven below the reference voltage by voltage 16. Again this negative voltage 116 is conveyed through resistor 112 to ground and accordingly gradually decays along a curve 118. If sufficient time is allowed the referenced voltage will again be attained. However, if the complementary electrode is again actuated in very close time proximity, the potential on the conductive layer will still be below the reference by a potential 120. Accordingly, when the complementary electrode is again actuated with voltage $V_e$, the conductive layer potential is increased by $V_e$. However, because the conductive layer potential started below the reference voltage by potential 120, the peak potential attained on the conductive layer is lower than in the preceding cycle by potential 120. Returning to FIG. 3B, when complementary electrodes 90 and 94 were first actuated a potential applied to the conductive layer was generally as illustrated by curve 82. However, when complementary electrodes 94 and 98 are actuated in very close time proximity, the conductive layer adjacent complementary electrode 94 achieves a lower potential than the first time by potential 120. The potential which the actuation of complementary electrodes applies to the conductive layer is illustrated by curve 122. Thus, the potential applied by the complementary electrodes for array 32 is less to the left side as illustrated in FIG. 3B than to the right. This lower potential reduces the static charge in the latent image which results in a lighter or more grey tone quality. Similarly, as each array is actuated the printing toward one side of the array will be more towards the light or grey region of tone quality whereas printing from the other side of the same array will have a darker or more black tone quality. These alternating regions cause the final printed image to have a striped appearance.

The invention contemplates solving the problem of the lower potential applied by the complementary electrodes to one side of each array in several ways. One way is to decrease the resistive value of the conductive layer to hasten the recovery rate to the reference potential of the effected region of the conductive layer. However, decreasing the resistive value of the conductive layer speeds the rate of voltage decay, hindering the reliability image creation. Another alternative is to increase the time period between subsequent actuations of the same complementary electrode. This can be done by shortening the complementary electrode driving pulse, by lengthening the time between actuation pulses, or by using the non-sequential actuation method of the preferred embodiment herein.

Shortening the duration of the actuating pulse of the complementary electrodes creates problems in the overall reliability of the charge transfer between the recording electrode and the record medium. Lengthening the time between actuations slows the printing speed. A non-sequential actuation pattern which returns to reactivate a complementary electrode such as 94 in the above example after intervening actuations of other complementary electrodes provides sufficient time for potential 120 to decay substantially to the reference potential.

When using the A-B phasing technique of alternating between arrays connected by first circuit means 46 and arrays interconnected by second circuit means 48, it is desirable to actuate every third array. In this manner, arrays in the first group are actuated then arrays in the second group, etc. A total of three passes through the arrays is required to actuate each array once. In the simplified image head shown in FIG. 2, the actuation sequence would be arrays 30, 36, 42, 32, 38, 44, 34, and 40. In this manner, no complementary electrode is actuated with two sequentially actuated arrays. Rather, each complementary electrode is given sufficient time to allow the conductive layer 14 to return to the reference potential between subsequent actuations. Other actuation sequences for the arrays may be used without departing from the present invention. For example, to print certain data in which it is known or determined that no image is to be printed in an affected region, the sequence need not allow time for that region to return to the reference level.

FIG. 6 is illustrative of circuitry for implementing the actuation sequencing of the preferred embodiment. It includes data receiving means F for receiving electronic data. The electronic data is described in terms of data lines which is one bit for each active recording electrode in the image head. The zero or unity value of each bit determines whether a corresponding recording electrode will be caused to deposit an electrostatic charge on the record medium. Each line of data may consist of one or more segments or words. The data receiving means includes a data bus 202 which normally has a smaller bit capability than the number of recording electrodes in an image head. Thus, each line of electronic data is received in several parts or words. For example, with an image head with 2176 recording electrodes an 8-bit data bus may be used. The 8-bit words, bites, from the data bus are received by a data buffer 204 and entered into an assembly memory means such as a RAM 206. In the current example, an 272×8 RAM memory is used to store 2176 bits in 272 eight bit words. Assembly RAM 206 assembles the parts of the data line into a plurality of words of data.

After an entire line of data is assembled into assembly RAM 206, a transfer means 210 transfers the data from the assembly RAM 206 to image memory means G. The image memory means is, in the preferred embodiment, a RAM memory matrix 212. This RAM memory has storage in one word for as many bits as there are recording styli in a corresponding array, and has as many words as there are arrays. If the 2176 recording electrodes are arranged in 16 arrays of 136 electrodes each, a 16×136 RAM memory is used. To create a greater density of recording electrodes along the recording head, the recording electrodes may be arranged in an offset pattern. This offset in effect creates two rows very close together. However, a slight time lag is required between actuating these two rows to form a straight line across the moving record medium. To allow for this time lag, the transfer means includes a first and a second delay RAM 220 and 222 which receive some of the data bits from assembly RAM 206. A data buffer 224 receives the delayed bits from RAM 222 and the undelayed bits directly from assembly RAM 206. For example, in each 8-bit line the four even data bits may be transferred directly from assembly RAM 206 to data buffer 224 while the four odd data bits are delayed through the delay RAMs.

The transfer process is controlled by a transfer and assembly mode control 226 and timed and coordinated with a transfer clock 228. The transfer and assembly mode control 226 controls an address selector and counter 230. An address bus 234 conveys appropriate addresses from counter 230 to RAMs 206, 220 and 222 during the transfer process. The address selector and counter 230 also indexes sequencing means H. The sequencing means includes an array address selection means 236 for addressing the appropriate 136-bit word of the image memory means. Because the image memory of the preferred embodiment is a 16 word×136 bit RAM, the 8-bit words from the assembly RAM must be reoriented. To select the appropriate locations in the image memory for the transfer words, a supplemental address means is required. This supplemental address means includes an ADDER 238 which receives the least significant 4-bits on the 8-bit address bus 234 and a 4-bit address from address selection means 236. ADDER 238 combines the two 4-bit address words and uses the sum to control a RAM selection means 240. RAM 240 provides the addresses necessary to fill the available 136-bit storage words of image memory G with the 8-bit words from assembly RAM 206 in the appropriate sequence.

The receiving and assembly of data written into assembly RAM 206 is independent from the reading of data from image memory means G for actuating selected recording electrodes. The assemble and image modes may be practiced simultaneously. The assemble and image modes may be practiced alternately with the transfer mode in which data is moved from the assembly RAM 206 to the image memory means G.

It is desirable to coordinate the timing for reading data from image memory means G to the recording electrodes with advancement of the record medium. Accordingly, after reading and imaging each line of data from image memory means G, the paper can be advanced incremental distance. Alternately, after each incremental advancement of the record medium, the control means may be enabled to start the next image mode. Each time the record medium advances an incremental distance a signal is generated on line 250. This clocks an encoder divider means 252 which in turn enables a strobe generating means 254. The strobe generator sends out a series of pulses which enable alternately driver circuits for the first and second groups of arrays and which enable the complementary electrodes.

In the preferred embodiment, the strobe generator generates a series of 12 microsecond pulses at about 16 microsecond intervals. Each pulse is strobed to a complementary electrode decoder 256 and alternate pulses are connected to recording electrode driver groups 258 and 260. Further, each strobe pulse increments an image address counter 262. The output of the counter is connected to an offset ADDER 264 which modifies the counter output so as to form addresses for the skip sequencing of actuating the complementary electrode assemblies. The offset ADDER 264 is connected to the image memory address selection means 236 which routes the ADDER addresses to select every third word in the image memory means G. Further the output of offset ADDER 264 is connected to decoder 256 which selects the appropriate pair of complementary electrodes for actuation. The decoder 256 is connected through a bank of OR gates 266 to a series of complementary electrode drivers 268.

At the completion of reading a line of data for imaging by the recording electrodes, counter 262 generates an end write signal on line 270. This signal resets encode divider 252 thus stopping strobe generator 254. Further, the signal on line 270 actuates transfer mode and assembly control 226 which stops the image mode and starts the transfer of data from assembly RAM 206 to image memory means G. At the end of the transfer mode control 226 starts the assemble mode during which a signal on line 250 can contemporaneously start a image mode.

Also illustrated in FIG. 6 is a master clock 280. This clock is connected to the divider means 282 which produces various clock signals for the control means and other parts of the recording apparatus. Divider 282 is connected to the transfer clock 228. Also connected to the divider means 282 is a control timing generator 284 which produces various system controls in conjunction with clock pulses and the address selector and counter means 230.

The invention has been described with reference to the preferred embodiment thereof. Obviously modifications and alterations will occur to others upon the reading and understanding of this specification. Such modifications and alterations are all included within the present invention insofar as they come within the scope of the appended claims or the equivalent thereof.

The invention claimed is:

1. An electrographic recording system for recording on a record medium having a charge retentive surface, said system comprising:
   a plurality of recording electrodes preferably mounted linearly and in close proximity to said record medium;
   circuit means operatively connecting said plurality of recording electrodes into a plurality of separate array groups, each group preferably containing an equal number of recording electrodes;
   a plurality of complementary electrode pairs preferably mounted in a linear arrangement having two end pairs and mounted in close proximity to said record medium, said complementary electrode pairs positioned so that said plurality of recording electrodes are located therebetween and wherein each separate array group is centered between two adjacent complementary electrode pairs; each of said complementary electrode pairs being shared by two adjacent, separate array groups except for said end pairs;

means for applying a first voltage pulse of one polarity and magnitude to at least one selected recording electrode in a first selected array group; p1 means for applying a first contemporaneous voltage pulse of opposite polarity from and of essentially equal magnitude with said first voltage pulse to the two adjacent complementary electrode pairs in which said first selected array group is centered; and means for controlling all subsequent voltage pulses to the recording electrodes in other selected array groups and to control the corresponding contemporaneous voltage pulses to the complementary electrode pairs such that no recording electrodes in adjacent separate array groups will be pulsed by consecutive voltage pulses, thus preventing a shared, single complementary electrode pair from being pulsed by consecutive contemporaneous voltage pulses.

2. An electrographic recording apparatus for charging the surface of a record medium with at least one latent electrostatic image comprising:

an image head adapted to be positioned in close proximity to the record medium for forming latent electrostatic images thereon, said image head comprising a plurality of arrays of recording electrodes, said arrays comprising a first group of arrays and at least a second group of arrays alternately arranged with the first group of arrays; a plurality of complementary electrodes, each complementary electrode mounted in electrical cooperative relationship with a single array in at least one of said first and second groups of arrays;

control means for said recording and complementary electrodes comprising recording electrode actuating means for applying a first voltage to at least one selected recording electrode; complementary electrode actuating means for selectively applying a first contemporaneous voltage of opposite polarity and of essentially equal magnitude with said first voltage to at least one complementary electrode in electrical cooperative relationship with the at least one selected recording electrode, said complementary electrode leaving an induced voltage of polarity opposite to said first contemporaneous voltage in a region adjacent said complementary electrode after removal of the application of the first contemporaneous voltage, said induced voltage decaying generally exponentially to a reference level; sequencing means for enabling the recording electrode actuating means and causing the complementary electrode actuating means to actuate sequentially complementary electrodes mounted adjacent to non-adjacent arrays of recording electrodes in which actuation of recording electrodes mounted adjacent a region of the record medium having an induced voltage is delayed until the induced voltage has decayed generally to the reference level.

3. An electrographic recording apparatus for charging the surface of a record medium with at least one latent electrostatic image comprising:

an image head adapted to be positioned in close proximity to the record medium for forming latent electrostatic images thereon, said image head comprising a plurality of arrays of recording electrodes, said arrays comprising a first group of arrays and at least a second group of arrays alternately arranged with the first group of arrays; a plurality of complementary electrodes, each complementary electrode mounted in electrical cooperative relationship with a single array in at least one of said first and second groups of arrays;

control means for said recording and complementary electrodes comprising recording electrode actuating means for applying a first voltage to at least one selected recording electrode; complementary electrode actuating means for selectively applying a first contemporaneous voltage of opposite polarity and of essentially equal magnitude with said first voltage to at least one complementary electrode in electrical cooperative relationship with the at least one selected recording electrode, said complementary electrode leaving an induced voltage of polarity opposite to said first contemporaneous voltage in a region adjacent said complementary electrode after removal of the application of the first contemporaneous voltage, said induced voltage decaying generally exponentially to a reference level; sequencing means for enabling the recording electrode actuating means and causing the complementary electrode actuating means to actuate sequentially complementary electrodes mounted adjacent to every third array of recording electrodes in which actuation of recording electrodes mounted adjacent a region of the record medium having an induced voltage is delayed until the induced voltage has decayed generally to the reference level.

4. An electrographic recording apparatus for charging the surface of a record medium with at least one latent electrostatic image comprising:

an image head adapted to be positioned in close proximity to the record medium for forming latent electrostatic images thereon, said image head comprising a plurality of arrays of recording electrodes, said arrays comprising a first group of arrays and at least a second group of arrays alternately arranged with the first group of arrays; a plurality of complementary electrodes, each complementary electrode mounted in electrical cooperative relationship with a single array in at least one of said first and second groups of arrays;

control means for said recording and complementary electrodes comprising recording electrode actuating means for applying a first voltage to at least one selected recording electrode, said control means further comprising means for receiving electronic data descriptive of at least a part of a line of data, image memory means for storing the received data, said memory means operatively connected to said receiving means and said recording electrodes, and a decoder means for controlling the actuation of selected ones of said complementary electrodes, said decoder means operatively connected with said complementary electrodes;

complementary electrode actuating means for selectively applying a first contemporaneous voltage of opposite polarity and of essentially equal magnitude with said first voltage to at least one complementary electrode in electrical cooperative relationship with the at least one selected recording electrode, said complementary electrode leaving an induced voltage of polarity opposite to said first contemporaneous voltage in a region adjacent said complementary electrode after removal of the application of the first contemporaneous voltage, said induced voltage decaying generally exponentially to a reference level; and, sequencing means for enabling the recording electrode actuating means and causing the complementary electrode actuating means to actuate complementary electrodes in a predetermined sequence in which actuation of recording electrodes mounted adjacent a region of the record medium having an induced voltage is delayed until the induced voltage has decayed generally to the reference level, said sequencing means comprising an address generating means for generating addresses for said image memory means and said decoder means, said address means operatively connected to said image memory means and said decoder means.

5. The apparatus as set forth in claim 4 wherein said memory means comprises a memory matrix, said memory matrix able to store a plurality of words of data, each word of data corresponding to an array of recording electrodes.

6. The apparatus as set forth in claim 5 wherein each word of the memory matrix is able to store several bits of data each bit of data corresponding to a record electrode in the corresponding array.

7. The apparatus as set forth in claim 6 wherein said address generating means serially generates the address of every third word and wherein said decoder means decodes each address for controlling actuation of the complementary electrodes which are mounted in electrical cooperative relationship with the array corresponding to the addressed word of said image memory matrix.

8. The method of producing an electrostatic latent image on a record medium with an image head comprising a plurality of arrays of recording electrodes, said arrays arranged generally across the image head and plurality of complementary electrodes, each complementary electrode positioned in electrically cooperative relationship with at least one array, the method comprising:
   (a) actuating selected recording electrodes in at least a first of said arrays and coincidently actuating at least one of the complementary electrodes positioned in electrically cooperative relationship with said first array;
   (b) next actuating selected recording electrodes in at least another of said arrays which next subsequent array is not adjacent any immediately previously actuated complementary electrodes and coincidently actuating at least one of the complementary electrodes positioned in electrically cooperative relationship with said another array;
   (c) repeating step (b) such that each next subsequent array is nonadjacent to the immediately preceding actuated array and until selected recording electrodes in substantially all of said plurality of arrays have been actuated.

9. The method of producing an electrostatic latent image on a record medium with an image head comprising a plurality of arrays of recording electrodes, said arrays arranged generally across the image head and plurality of complementary electrodes, each complementary electrode positioned in electrically cooperative relationship with at least one array, the method comprising:
   (a) actuating selected recording electrodes in at least a first of said arrays and coincidently actuating at least one of the complementary electrodes positioned in electrically cooperative relationship with said first array;
   (b) next actuating selected recording electrodes in at least another of said arrays which next subsequent array is not adjacent any immediately previously actuated complementary electrodes and coincidently actuating at least one of the complementary electrodes positioned in electrically cooperative relationship with said another array;
   (c) repeating step (b) such that each next subsequent array in which selected recording electrodes are actuated is separated by two arrays from the immediately preceding array in which recording electrodes were actuated and until selected recording electrodes in substantially all of said plurality of arrays have been actuated.

* * * * *

UNITED STATES PATENT AND TRADEMARK OFFICE
CERTIFICATE OF CORRECTION

PATENT NO. : 4,271,417
DATED : June 2, 1981
INVENTOR(S) : Blumenthal, John; Moore, Chad Z.

It is certified that error appears in the above-identified patent and that said Letters Patent are hereby corrected as shown below:

In Claim 1, Column 11, line 3, please delete "pl means" and

In Claim 1, Column 11, line 4, insert --means-- to begin next paragraph.

Signed and Sealed this

Eighteenth Day of May 1982

[SEAL]

Attest:

Attesting Officer

GERALD J. MOSSINGHOFF

Commissioner of Patents and Trademarks